(12) United States Patent
Chao

(10) Patent No.: US 6,215,776 B1
(45) Date of Patent: Apr. 10, 2001

(54) SATELLITE COMMUNICATION SYSTEM

(75) Inventor: William W. Chao, Cupertino, CA (US)

(73) Assignee: Lockheed Martin Missiles & Space Company, Sunnyvale, CA (US)

(*) Notice: Subject to any disclaimer, the term of this patent is extended or adjusted under 35 U.S.C. 154(b) by 0 days.

(21) Appl. No.: 08/947,015

(22) Filed: Oct. 8, 1997

(51) Int. Cl.⁷ .................................................. H04B 7/185
(52) U.S. Cl. ........................ 370/316; 370/331; 445/12.1; 445/436
(58) Field of Search .................................. 370/316, 321, 370/331, 332, 337; 455/12.1, 13.1, 13.3, 430, 432, 436, 427

(56) References Cited

U.S. PATENT DOCUMENTS

| | | | |
|---|---|---|---|
| 4,991,133 | 2/1991 | Davis et al. | 364/900 |
| 5,142,622 | 8/1992 | Owens | 395/200 |
| 5,280,480 | 1/1994 | Pitt et al. | 370/85.13 |
| 5,408,237 * | 4/1995 | Patterson et al. | 455/12.1 |
| 5,434,852 | 7/1995 | La Porta et al. | 370/58.2 |
| 5,485,464 * | 1/1996 | Strodtbech et al. | 455/12.1 |
| 5,581,558 | 12/1996 | Horney, II et al. | 370/60 |
| 5,600,629 | 2/1997 | Van Daele et al. | 370/349 |
| 5,625,867 * | 4/1997 | Rouffet et al. | 455/13.1 |
| 5,634,190 | 5/1997 | Weideman | 455/13.1 |
| 5,732,351 * | 3/1998 | Olds et al. | 455/436 |

* cited by examiner

*Primary Examiner*—Douglas W. Olms
*Assistant Examiner*—Shick Hom
(74) *Attorney, Agent, or Firm*—Swidler Berlin Shereff Friedman, LLP

(57) ABSTRACT

A multimedia communication system having a plurality of mobile, fixed location, and portable terrestrial communication terminals. The system links terrestrial communication terminals together through a network of non-geostationary satellites. The satellites communicate with a communication protocol similar to terrestrial communication protocols to reduce protocol conversion. The source and destination addressing uses static terrestrial cells for the uplink and the downlink. The terminal data stream is segmented into communication packets at the terrestrial gateway based on the uplink satellite's determination of system parameters. A control satellite dynamically balances up-links and down-links in the terrestrial areas with over-lapping satellite coverage.

26 Claims, 6 Drawing Sheets

| INDEX ~110 | TERMINAL ~112 | GATEWAY ~114 | CELL NO. ~116 |
|---|---|---|---|
| 1 | BILL | GW_ONE | 25.1.4.4 |
| 2 | TERRY | GW_TWO | 25.3.3.4 |
| 3 | BOB | GW_ONE | 25.1.4.4 |
| 4 | TED | GW_THREE | 33.5.6.2.1 |
| ... | | | |

*FIG. 5*

| SATELLITE PLANE : 1 | |
|---|---|
| SATELLITE ~118 | STATIC CELL ~120 |
| 1 | 25, 28, 29 |
| 4 | 8, 9 |
| 7 | 1 |
| 12 | 25, 26, 28 |
| 16 | 25 |
| ... | |

*FIG. 6*

| | CALL INFORMATION | | | | |
|---|---|---|---|---|---|
| CELL ADDRESS 124 | USER 126 | DESTINATION CELL ADDRESS 128 | DURATION 130 | USER SERVICE 132 | CALL TYPE 134 |
| 25.1.4.4 | BILL | 96.4.3 | 18.0567 | | POINT-TO-POINT |
| 25.3.3.4 | TERRY | 3.5 | 6.5202 | | MULTI-CAST |
| ... | | | | | |

FIG. 7

| | SATELLITE INFORMATION | | |
|---|---|---|---|
| CELL ADDRESS 124 | LoS SATELLITES 136 | LoS TRAFFIC STATUS 138 | LoS ISL STATUS 140 |
| 25.1.4.4 | A | 80% | 2 |
| 25.1.4.4 | B | 10% | 2 |
| 25.1.4.4 | D | 95% | 1 |
| 25.3.3.4 | A | 80% | 6 |
| 25.3.3.4 | C | 50% | 6 |
| 25.3.3.4 | G | 62% | 1 |
| ... | | | |

FIG. 8

| CELL ADDRESS 150 | SATELLITE (PLANE, NUMBER) | | | | | |
|---|---|---|---|---|---|---|
| | A (1, 5) 152 | B (2, 3) 154 | C (1, 6) 156 | D (1, 7) 158 | E (2, 4) 160 | ... 162 |
| 25.1.4.4 | | -3 MIN | -6 MIN | -1 MIN | +1 MIN | |
| 25.3.3.4 | -1 MIN | -4 MIN | -6 MIN | -2 MIN | | |
| ... | | | | | | |
| 26.1.2.3 | -2 MIN | | +7 MIN | -3 MIN | | |
| ... | | | | | | |

FIG. 9

SATELLITE COMMUNICATION SYSTEM

FIELD OF THE INVENTION

The present invention relates generally to a method of communicating between data processing systems, and more particularly, to terrestrial communication systems communicating through a satellite communication system.

BACKGROUND OF THE INVENTION

Various communication systems provide a communication path between terrestrial data processing systems through a satellite system. The earliest satellite systems, known as "bent pipe" satellites, echoed signals between terrestrial transmitters and receivers. These systems required a significant number of satellites and terrestrial transmitters and receivers.

More recently, satellite systems route communication between satellites, thus requiring fewer terrestrial stations. Inter-satellite routing methods include circuit switching and packet switching. Circuit switch routing defines a communication path from source to destination and maintains that channel throughout the communication. Circuit switching is inherently inefficient since the channel is dedicated to the communication regardless of the amount of data being transmitted.

Packet switch routing, also known as virtual circuit switching, allocates the communication paths for each segment("packet") of the communication rather than the entire communication. Thus, a path can be used by multiple terminals, since each only uses that path during data transmission. U.S. Pat. No. 5,600,629 discloses an example packet switch routing system.

Communication paths can be either static or dynamic. Static communication paths are determine at the beginning of a communication session and used throughout that session. Since the routing is static, all packets associated with the communication follow the same communication path. Static routing provides a simple mechanism to route messages. However, it fails to take to advantage of changing loads and resource availability.

Dynamic routing transfers data packets based on system resource availability. Thus, each data packet may traverse the network through a different route. However, dynamic routing that bases route determination on system resource that are available at the beginning of a transmission fail to take advantage of resource changes that occur during the transmission of the data packets.

Satellite communication protocols often vary substantially from their terrestrial counterparts. Thus, significant time and computations are required to convert terrestrial communication protocols to satellite communication protocols. A need exists for a satellite system that uses a protocol substantially similar to terrestrial protocols.

Addressing in satellite systems is either based on satellite locations or fixed geographic locations.

An Earth fixed cell addressing methods is disclosed in U.S. Pat. No. 5,408,237, Patterson, et al. Such addressing reduces the computations during the transfer or "hand-off" of terrestrial links.

Non-geostationary satellites must hand-off terrestrial communication links before the satellite's coverage area moves beyond the terrestrial gateway. U.S. Pat. No. 5,625,867 discloses a hand-off method based in part on the quality of service. Efficient utilization of over-lapping can be maximized by determining hand-off based not only on quality of service but also on a variety of system parameters. Thus, a need exists for a satellite system to base the hand-off decision on a variety of system parameters.

Existing satellite systems coordinate between two overlapping satellites. The satellite currently linked to the terrestrial station acts as the master and the other over-lapping satellite acts as a slave. As the master, a satellite determines when to hand-off a communication link. Over-lapping satellites require more coordination when the complexity of determining efficient hand-offs increases, and when the number of overlapping satellites increase, and when the number of hand-offs increases. Thus, a need exist for a satellite system with a coordinating satellite that determines when hand-off should occur and between which satellites the hand-off should occur. Such a control satellite minimizes the computations required to determine the optimal load balancing between over-lapping satellites within the static cell.

SUMMARY OF THE INVENTION

An object of the present invention is to link remote terrestrial terminals together through a dynamically routed packet switched satellite communication system using a protocol which is substantially compatible with terrestrial network protocols.

Another objects of this invention is to reduce the search time for dynamically routing packets.

A further object of this invention is to manage non-geostationary satellites in order to balance the communication load for the respective satellites.

BRIEF DESCRIPTION OF THE DRAWINGS

FIG. 5 is a representative table of terminals and their associated cell identification;

FIG. 6 is a representative table of cells covered by each satellite in a plane;

FIG. 7 is a representative table of connection information for each in progress communication stream;

FIG. 8 is a representative table of satellite loading per cell; and

FIG. 9 is a representative table of time based satellite coverage area per cell.

DETAILED DESCRIPTION OF THE PREFERRED EMBODIMENT

Figure 1:
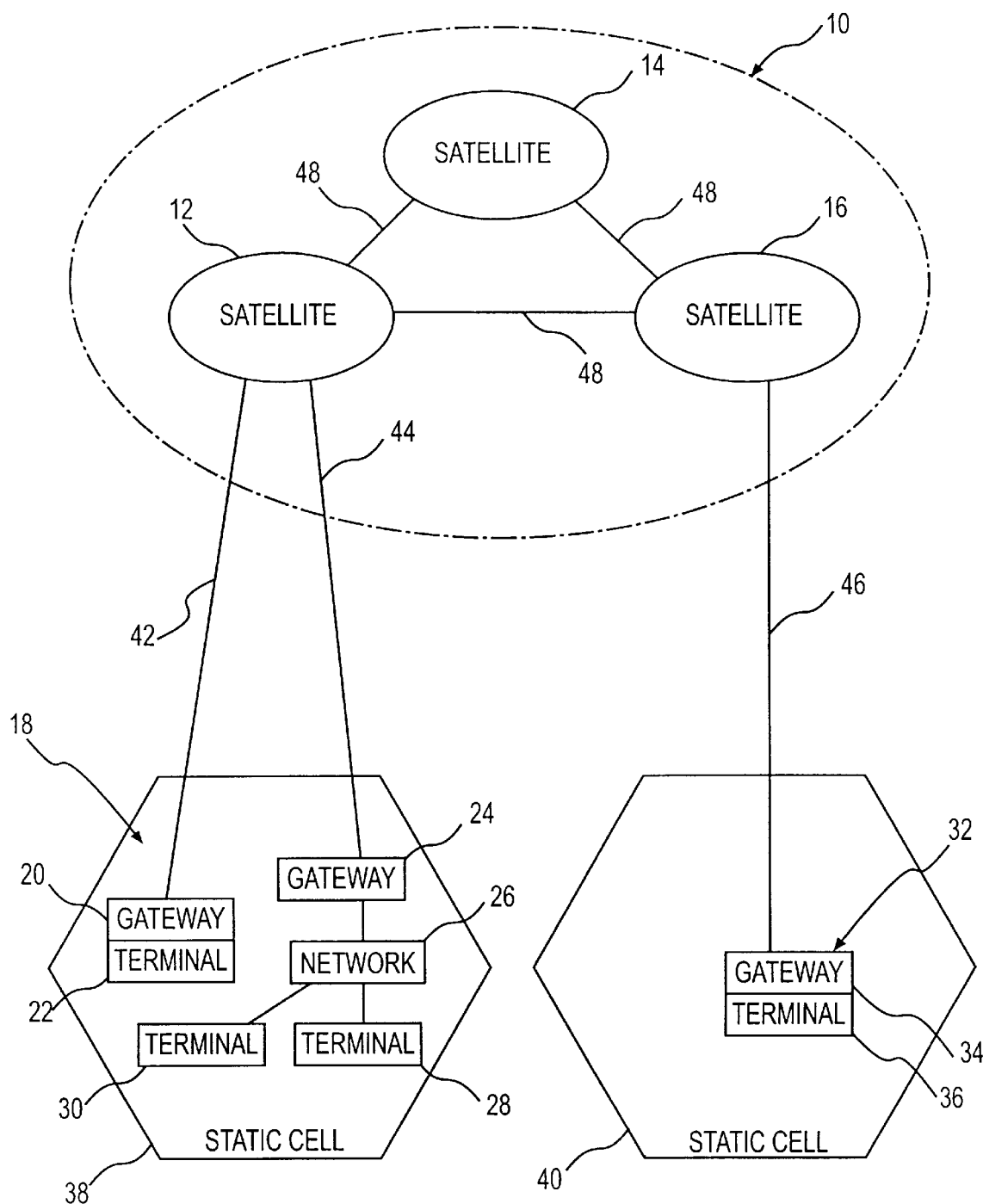
FIG. 1 is a schematic representation of a communication system connecting remote terrestrial systems together through a satellite system.

Referring to FIG. 1, various terminals 22, 28, 30, and 36 are linked together through a satellite communication system 10. The satellite communication system 10 includes a plurality of non-geostationary orbiting satellites 12, 14, and 16.

A terminal 22 in a static cell 38 communicates with a terminal 36 in a remote static cell 40 through a satellite communication system 10. Terminals 30 and 28 are linked directly or through a network 26 to a gateway 24. While not shown in FIG. 1, a terminal 30 can communicate with more than one gateway and a gateway 24 can communicate with one or more satellites. For example, FIG. 5 represents a table of links between terminals in column 112 and gateways in column 114. A static cell "25.1.4.4" in column 116 has one or more gateways within it.

As satellites orbit the Earth in non-geostationary orbits, their respective terrestrial coverage areas vary. Every satellite in the satellite communication system 10 is linked to at least one other satellite in that system. For example, FIG. 1 shows satellite 12 linked to satellite 14, which in turn is linked to satellite 16. A satellite 12 communicates with one or more gateways within one or more static cells.

Referring to FIG. 6, each satellite in plane 1 and its corresponding coverage area are tracked in column 118 and 120 respectively.

The gateway 20 (FIG. 1) communicates with one or more satellites when are within the satellite's coverage area. When a gateway is within the coverage area of a plurality of satellites the gateway is in what is known as an overlap state. A gateway is "blacked-out" when it is outside the coverage area of any satellites in the satellite communication system 10.

Referring to FIG. 1, a plurality of terminals 28 and 30 in a static cell 38 are linked to a single gateway 24. While not shown in FIG. 1, a terminal 30 can communicate with a plurality of gateways. A terminal 28 and 30 can be remotely located with respect to a gateway 24 or a terminal 22 can be co-located with a gateway 20. The terminals 22, 28, and 30 and the gateways 20 and 24 can be fixed location devices, mobile devices, or portable devices. They can be land based, water based, or airborne devices. For example, a mobile satellite phone 32, which communicates directly with a satellite 16, contains both a terminal 36 and a gateway 34 in one hand-held unit 32.

Typically, communication between terminals 28 and 30 follows a structured communication protocol, such as the Internet Protocol version 4 ("IPv4"), Internet Protocol Next Generation ("IPv6"), or asynchronous transfer mode ("ATM"). A gateway 24 translates the terminal protocol to the satellite communication protocol before transmitting the communication to the satellite 12.

In accordance with the present invention, the satellite communication protocol is substantially similar to the terminal protocol. As a result, the translation computations needed to convert between the terminal and the satellite communication protocol are minimized.

The satellite 12 (FIG. 1) in communication with a source gateway 24 in a static cell 38 determines the optimal payload length 88 (FIG. 4) for transmitting a data stream through the satellite communication system 10. The gateway 24 segments the communication stream into packets 70 of the optimal length. The optimal payload length 88 is based on dynamic communication factors in the satellite communication system 10. These factors include link error rate, quality of service, priority, cost of service, and the number of available links.

Figure 2:
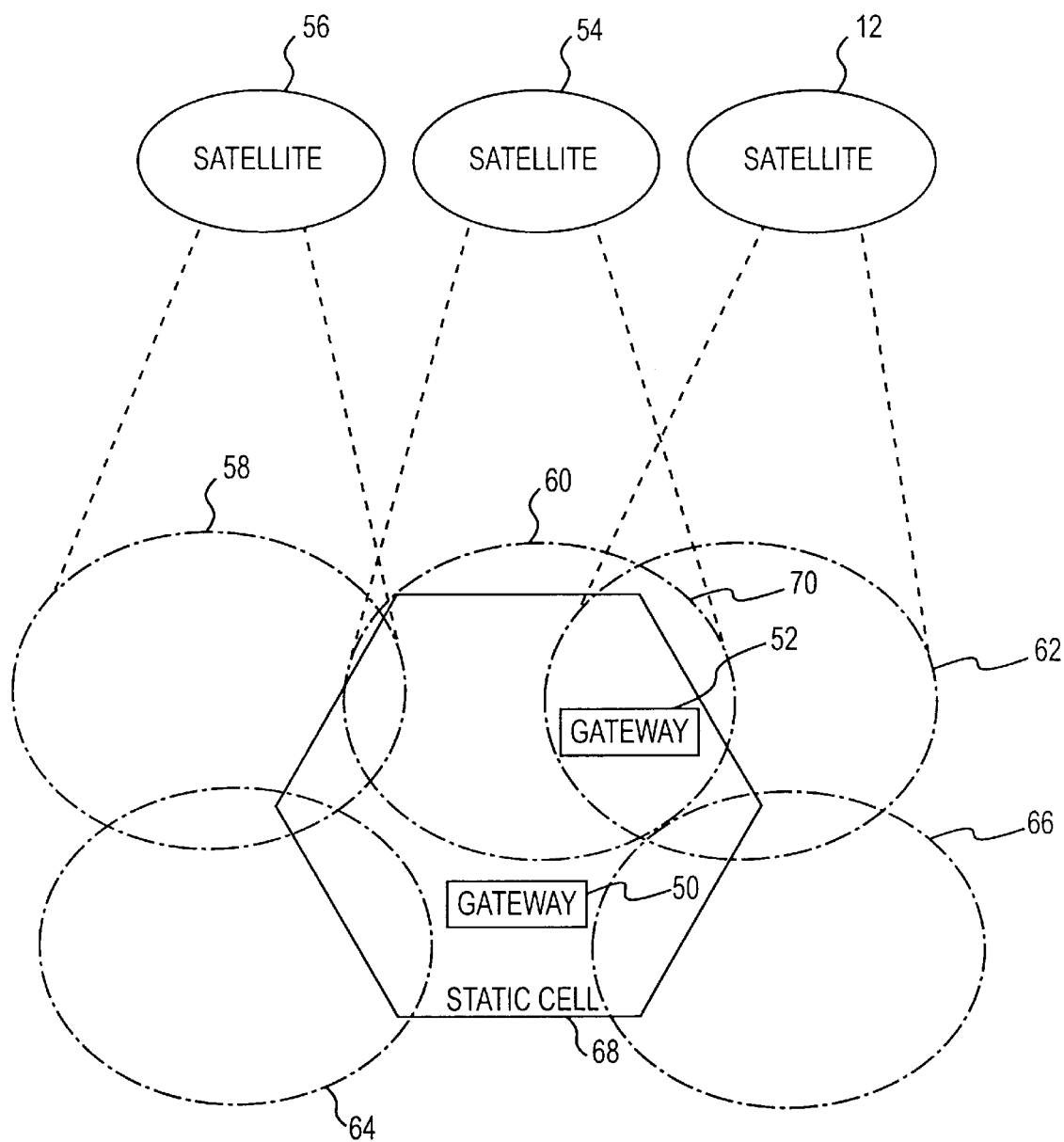
FIG. 2 is a schematic representation of satellite coverage areas.
Figure 3:
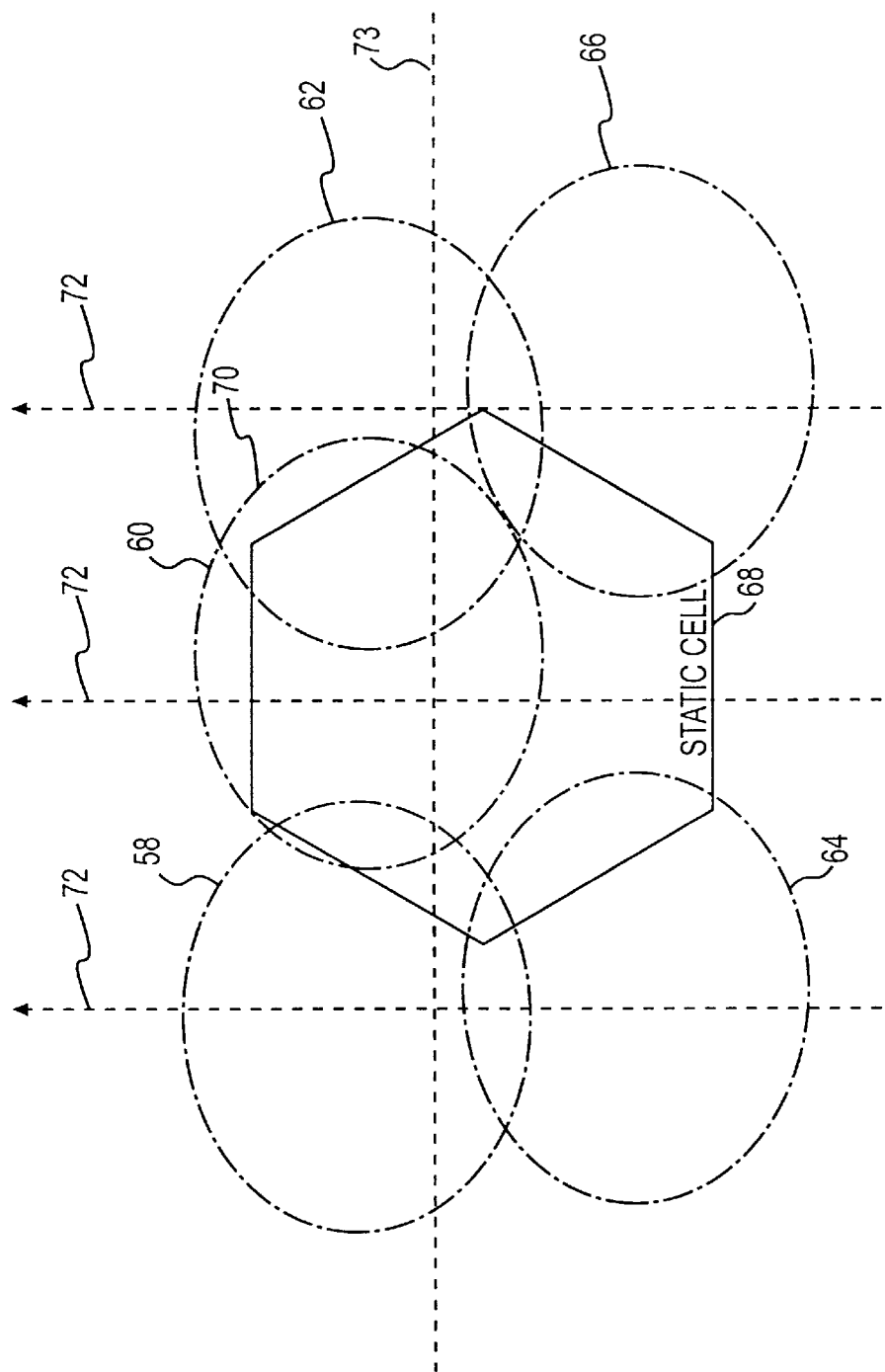
FIG. 3 is a schematic representation of satellite orbits and satellite planes.

Referring to FIG. 2, all potential terrestrial coverage areas are partitioned into static cells as disclosed in U.S. Pat. No. 5,408,237. The satellites are addressed by plane number and satellite number. The planes 73 (FIG. 3) are perpendicular to the orbits 72 of the non-geostationary satellites 12, 14, and 16 (FIG. 1).

For example, FIG. 5 shows a representative table of terminal links to gateways and the associated static cell address of the gateway. This table is updated when a gateway moves to a different static cell address.

Referring to FIG. 6, a representative table of satellites in a plane 1 identifies which static cell each satellite is in contact with. Each control satellite in control of static cell in plane 1 monitors this table. Each control satellite 54 (FIG. 2) updates the table when the information concerning a satellite 56 (FIG. 2) under its control changes. Each control satellite 54 (FIG. 2) transmits the updates to adjacent control satellites.

Gateway addressing in less populated areas uses fewer levels than addressing in more populated areas. There is no technological limit to the number of levels that can be used for addressing. However, it is a preferred embodiment of the present invention that the addressing includes from one to ten levels.

Figure 4:
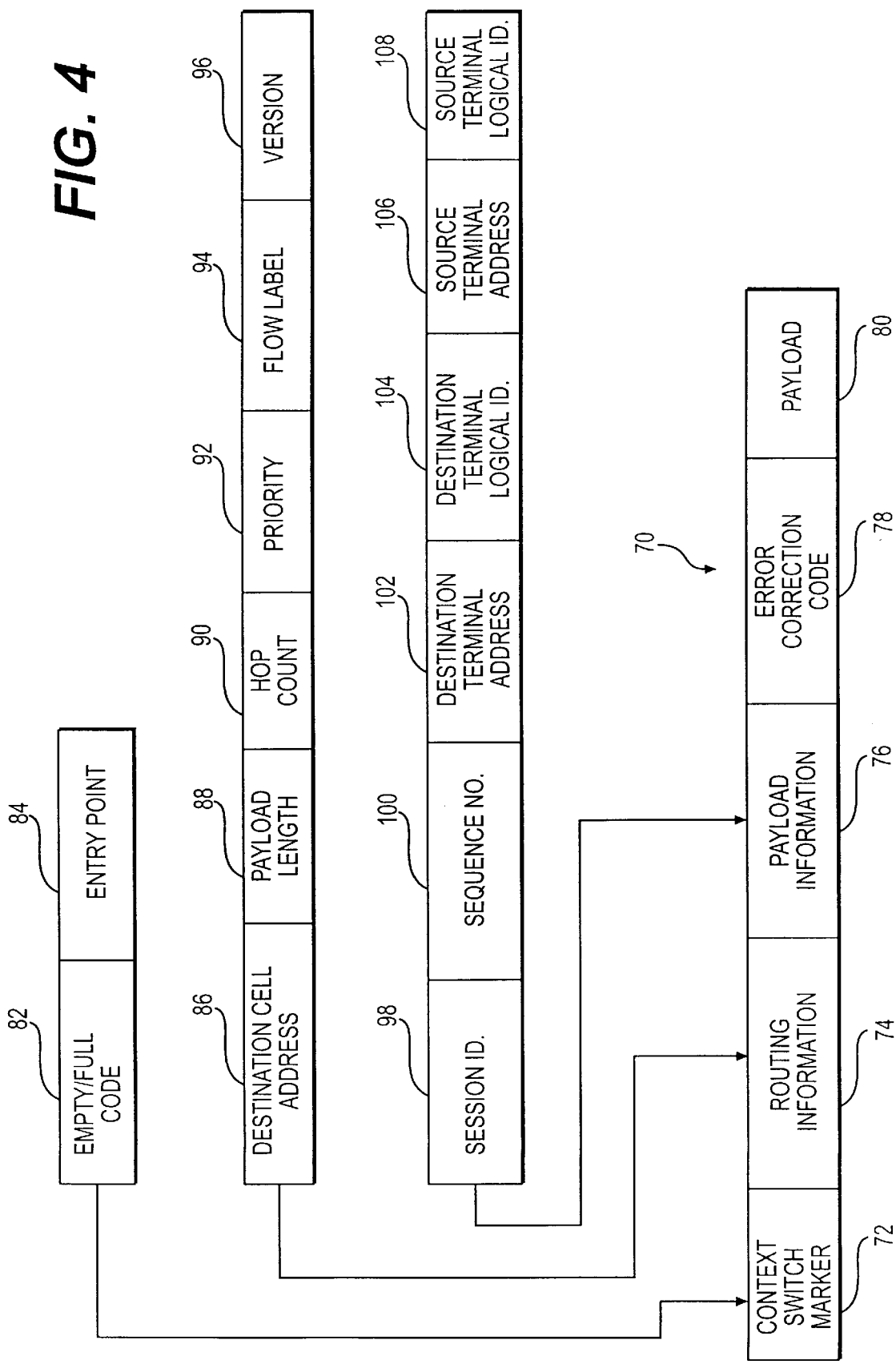
FIG. 4 is a representative table for a satellite communication packet.

Referring to FIG. 1, the satellites 12, 14, and 16 communicate using a satellite communication protocol. FIG. 4 illustrates one such protocol and the structure of a packet 70 within the protocol. As shown in FIG. 4, the packet 70 includes a context switch marker 72, routing information 74, payload information 76, and an error correction code 78, payload ("terminal data") 80.

The context switch marker ("CSM") 72 reduces the computations required to route a packet 70. Since each satellite 12, 14, and 16 determines the optimal route for each packet 70 it receives, the efficiency of the route determination process is critical to the over all system performance. To reduce the subsequent search time, the satellite 12 linked to the source gateway 24 determines not only the current optimal route but also a context switch marker 72 for each packet 70 it receives.

The CSM 72 is included in each packet 70 for reference by other satellites 14 and 16 routing the same packet. Referring to FIG. 4, the CSM 72 includes an empty/full code 82 and an entry point 84. The empty/full code 82 indicates whether an entry point 84 has previously been determined and placed in the packet 70.

When a satellite 12, 14, and 16 receives a packet 70 with the empty/full code 82 indicating empty, the satellite 12, 14, and 16 determines the entry point 84 and places it in the packet 70. The entry point 84 provides a starting point in the routing table similar to an index or bookmark. Thus, subsequent satellites 12, 14, and 16 begin their routing search from the entry point 84 and do not search the entire routing table. After each satellite 12, 14, and 16 completes the route determination, the satellite 12, 14, and 16 updates the entry point 84 to reflect current location of the routing information. Thus, if the routing tables changes while a packet is being routed, the entry point 84 remains accurate because each satellite 12, 14, and 16 routing the packet 70 updates the entry point 84.

Each satellite 12, 14, and 16 uses the routing information 74 to determine the optimal route for that packet 70. The routing information 74 includes: a destination cell address 86, a payload length 88, a hop count 90, a priority 92, a flow label 94, and a version 96.

The destination cell address 86 includes an address of the destination gateway 34 (FIG. 1). The payload length 88 specifies the length of the payload 80 in the packet 70. The hop count 90, as defined in Internet Protocol version 6, indicates the maximum number of satellite links allowed for the packet 70.

Referring to FIG. 4, the priority 92 indicates the priority level of a communication stream. Each packet 70 in a communicate stream receives the same priority 92. Traffic from communication streams with higher priority are routed over shorter or more reliable routes. Priority levels as defined in Internet Protocol version 6 include uncharacteristic traffic, filter traffic, unattended data transfer, interactive traffic, internal satellite traffic, and highest quality of service traffic.

Satellites 12, 14, and 16 are configured by packets 70 with a priority 92 of "internal satellite traffic." Network control centers, remote network control centers, and satellite control centers transmit satellite configuration data. Configuration data includes updates to routing tables and satellite navigation control information.

The flow label 94 provides a 24 bit unique code sequence that uniquely identifies a communication stream as defined by Internet Protocol version 6.

The version 96 is a four bit code that identifies the communication protocol version as defined by Internet Protocol version 6.

Referring to FIG. 4, the payload information 76 is included in the packet 70, but it is not used by the satellite system 10. The payload information 76 can include a session identification 98, a sequence number 100, a destination terminal address 102, a destination terminal logical identification 104, a source terminal address 106, and a source terminal logical identification 108.

The source gateway 24 (FIG. 1) create the payload information 76. The destination gateway 34 (FIG. 1) uses the payload information 76 to reassemble the payload 80 in the correct order before forwarding the payload to the destination terminal 36 (FIG. 1). For example, a second packet arrives at the destination gateway 34 before the first packet. The destination gateway 34 orders the payload data in the correct sequence based on the sequence number 100 in each of the first and second packets 70. The destination gateway 34 then transmits the data to destination terminal 36.

The Error Correction Code("ECC") 108 enables the satellite system 10 to detect, errors in a packet 70. Depending on the type of error, the ECC 108 can also be used to correct the error.

If an error is detected in a packet 70, the source terminal address 106 and source terminal logical identification 108 are used to notify the source terminal 30 (FIG. 1) that an error occurred. If desired, the destination terminal 36 (FIG. 1) can request the packet 70 to be re-transmitted.

The payload 80 includes ordered data from a source terminal 30 (FIG. 1) directed toward a destination terminal 36 (FIG. 1). For example, a terminal 30 transferring ten ATM data cells may require two packets 70. The first packet's payload 80 includes the first six ATM data cells in their correct order. The next packet 70 includes the remaining four ATM data cells in their correct order. The ATM data cells including all protocol and header information are encapsulated into the respective payloads.

A communication stream is segmented into packets 70. For each communication stream, a gateway 24 (FIG. 1) requests an optimal payload length 88 from a satellite 12 (FIG. 1). The satellite evaluates system parameters and communication parameters. The system parameters include which satellites are available to link the source and destination gateways, the loads on each of the available satellites, error rate of each satellite, cost of service, and the number of hops required. The communication parameters include the priority, the hop count, and amount of data to be transferred.

The packets 70 are routed among the non-geostationary satellites 12, 14, and 16 using the satellite communication protocol. The optimal route for each packet 70 is determined independently at each satellite. Route determination is based on satellite system parameters. The satellite determines the error rate of every existing link to other satellites and to gateways.

To enhance communication reliability on links with lower quality of service ("QoS"), a source terminal 30 (FIG. 1) can transmit multiple copies of the same packet 70. The payload information of the packet 70 includes identical session identification 98 and sequence numbers. Thus, the destination gateway 34 (FIG. 1) recognize the packets 70 as repeated packets. The gateway 34 then compares the payload of the repeated packets. The repeated payloads are compared bit by bit. That is, the first bit of the payload of each packet is compared, then the next bit is compared until each bit has been compared. The value of each original transmitted bit is determined by a simple majority. Since a simple majority is required to determine the value of the original transmitted data, it is desirable to transmit an odd number of repeat packets. In a preferred embodiment of the present invention three copies of the terminal data are sent when repetition is desired.

Referring to FIG. 2, a control satellite 54 manages the links within the static cell 68 including the selection of satellites with over-lapping coverage areas. For example, gateway 52 is within the over-lap area of two satellites 12 and 54. The control satellite 54 determines which satellite provides a link or route with the gateway. The control satellite follows the route determination process described above.

As explained below, each static cell has a control satellite 54. Communication links with a gateway 52 are balanced between over-lapping satellites 54 and 12 by the control satellite 54. Thus, if satellite 54 as the control satellite for cell 68 determines that satellite 12 is less loaded than satellite 54, the communication link with gateway 52 is transferred to satellite 12.

The control satellite 54 balances the links based on communication factors including traffic density, transport delays, quality of service, computational capacity, lack of coverage timing, cost of service, and error rate in the static cells. Factors specific to each satellite in the overlap state include logical user identifications of terminal, connection time of each link, satellite identification, end of coverage time per satellite, traffic status, and access code.

Satellite coverage areas are constantly moving since the satellites 12, 54, and 56 are non-geostationary. As a satellite moves to a new static cell, it requests satellite information for all satellites in the new static cell from the control satellite of the new static cell. If no control satellite exists of the new static cell, the first satellite to enter the static cell assigns itself as the control satellite. If a control satellite exists for that static cell, the satellite transmits its satellite information to the control satellite. The satellite information includes connection time of each terrestrial link, satellite identification, end of coverage time per gateway, and access codes.

Moreover, if the satellite was a control satellite in the static cell it is moving out of, it assigns a different satellite as the control satellite for the static cell before leaving the static cell.

Referring to FIG. 2, as a satellite exits a static cell, it transmits an "exiting cell" message to the control satellite. If the exiting satellite is the control satellite, the exiting control satellite determines the satellite with the longest remaining coverage time in the static cell and makes that satellite the next control satellite. The exiting control satellite transmits to each satellite it controls a message identifying the new control satellite.

The control satellite maintains satellite coverage information. An example of such information is represented in FIG. 9. Each satellite's time until coverage or coverage time remaining 152, 154, 156, 158, 160, and 162 is updated by each satellite transmitting changes in the information to the control satellite. The table represents static cells in column 150 and the time remaining for current satellites' coverage and the time until future satellites' coverage.

Referring to FIG. 2, a gateway 50 not within the coverage area of a satellite is "blacked-out". Terminals linked to more than one gateway can route their communication through a gateway within a satellite's coverage area to avoid the black-out.

The control satellite 54 for a static cell 68 determines when a gateway 50 will be blacked-out. The control satellite transmits a message to the gateway 50 before it is blacked-out identifying the black-out start and stop time. The gateway 50 routes messages over available terrestrial links during black-out periods.

If no terrestrial link exists, the gateway 50 stores communication data during a black-out period. Once satellite coverage resumes, the gateway 50 transmits the stored communication data over the satellite link.

The routing information are maintained at each satellite and updated periodically. Examples of the routing information maintained at each satellite is illustrated in FIG. 5 and FIG. 6.

While a preferred embodiment has been shown and described, it will be understood that it is not intended to limit the disclosure, but rather it is intended to cover all modifications and alternate methods and apparatuses falling within the spirit and scope of the invention as defined in the appended claims or their equivalents.

What is claimed is:

1. A satellite communication system for multimedia communication comprising:
    (a) a plurality of non-geostationary communication satellites;
    (b) a plurality of mobile and terrestrial communication systems linked to the non-geostationary satellites;
    (c) means for communicating between non-geostationary satellites using a satellite communication protocol which is compatible with mobile and terrestrial communication protocols and reduces protocol conversion;
    (d) means for dynamically fixing the non-geostationary satellites with respect to terrestrial cells serving as transmitting and receiving points, wherein the means for dynamically fixing performs the steps of:
        (i) defining terrestrial coverage areas as static cells; and
        (ii) addressing the static cells in planes that are perpendicular to the orbits of the non-geostationary satellites, the addressing including variable resolution within the static cells.
    (e) means for segmenting terminal data into communication packets for transmitting through the satellite communication system;
    (f) means for routing communication packets among non-geostationary satellites using the satellite communication protocol; and
    (g) means for dynamically balancing terrestrial communication links among the non-geostationary satellites in an over-lapping state.

2. The satellite communication system according to claim 1, wherein the means for communicating between the non-geostationary satellites includes communication packet comprising:
    (a) terminal data;
    (b) payload information;
    (c) routing information; and
    (d) an error correction code.

3. The satellite communication system according to claim 1, further including means for calculating an efficient communication packet size for transmitting terminal data through the satellite communication system, the calculating based on measuring communication factors including:
    (a) an error rate;
    (b) a quality of service;
    (c) a traffic status;
    (d) a cost of service; and
    (e) a count of available links.

4. The satellite communication system according to claim 1, wherein the means for routing communication packets among non-geostationary satellites using the satellite communication protocol includes measuring communication factors including:
    (a) an error rate;
    (b) a quality of service;
    (c) a traffic status;
    (d) a cost of service; and
    (e) a count of available links.

5. The satellite communication system according to claim 1, wherein the means for dynamically balancing the terrestrial communication links among satellites in an overlapping state comprising:
    (a) measuring communication factors in a static cell including:
        (i) a traffic density;
        (ii) a transport delay;
        (iii) a quality of service;
        (iv) a computational capacity;
        (v) a lack of coverage timing;
        (vi) a cost of service;
        (vii) a traffic status;
        (viii) an error rate in the source and destination static cells;
    (b) measuring satellite factors for each satellite in the over-lapping state including:
        (i) a logical user identification of a terminal;
        (ii) a connection time of each connection;
        (iii) a satellite identification;
        (iv) an end of coverage time;
        (v) a traffic status specific to each satellite in the overlapping state;
        (vi) an access code; and
    (c) allocating terrestrial links to the non-geostationary satellites covering the static cells such that loads are balanced between over-lapping satellites based on the communication factors and the satellite factors.

6. The satellite communication system according to claim 1, wherein the links between the non-geostationary satellites and the terrestrial communication systems are managed by a control satellite in each static cell comprising the steps of:
    (a) selecting one of the non-geostationary satellites first in time to enter the static cell to control communication links within that static cell;
    (b) requesting satellite information from each satellite upon entering the static cell;
    (c) assigning new terrestrial links to non-geostationary satellites based on the control satellite's determination of satellite information of each satellite covering the static cell;
    (d) re-assigning existing terrestrial links to a different non-geostationary satellites based on the control satellite's determination of the satellite information of each satellite covering the static cell; and (e) assigning a different satellite to control the static cell before a current control satellite leaves the static cell.

7. The satellite communication system according to claim 1, wherein each non-geostationary satellite determines a route for each communication packet by referencing a dynamic routing table using a context switch marker to reduce search time, the context switch marker provides a reference point in a static cell data base for searching for the static cell's location and routing information.

8. A satellite communication system capable of multimedia communication comprising:

(a) a plurality of non-geostationary communication satellites, each of the plurality of non-geostationary communication satellites being assigned to cover a static terrestrial cell;

(b) a plurality of control satellites which are a subset of the plurality of non-geostationary communication satellites, each control satellite being assigned to cover a static terrestrial cell and each static terrestrial cell being assigned no more than one control satellite, wherein each control satellite dynamically balances terrestrial communication links among the satellites assigned to the corresponding static terrestrial cell such that the loads are balanced between the satellites covering that static terrestrial cell;

(b) a first non-geostationary communication satellite assigned to cover a first static terrestrial cell;

(c) a first gateway located in the first static terrestrial cell, the first gateway
  (i) receiving a first data stream having a terrestrial protocol from a first terrestrial communication unit;
  (ii) converting the first data stream into communication packets having a satellite communication protocol, wherein the satellite communication protocol is similar to the terrestrial protocol;
  (iii) sending the communication packets to the first non-geostationary communication satellite over a first link;

(d) a second non-geostationary communication satellite assigned to cover a second static terrestrial cell, the second non-geostationary communication satellite receiving the communication packets routed from the first non-geostationary communication satellite; and (e) a second gateway located in the second static terrestrial cell receiving the communication packets from the second non-geostationary communication satellite over a second link, converting the communication packets into a second data stream having the terrestrial protocol, and sending the second data stream to a second terrestrial communication unit.

9. The satellite communication system of claim 8, wherein each control satellite makes a load determination based on communication factors and satellite factors.

10. The satellite communication system of claim 9, wherein the communication factors include at least one of:
  (i) a traffic density;
  (ii) a transport delay;
  (iii) a quality of service;
  (iv) a computational capacity;
  (v) a lack of coverage timing;
  (vi) a cost of service;
  (vii) a traffic status; and
  (viii) an error rate in the source and destination static cells.

11. The satellite communication system of claim 9, wherein the satellite factors are factors specific to a satellite and include at least one of:
  (i) a logical user identification of a terminal;
  (ii) a connection time of each connection;
  (iii) a satellite identification;
  (iv) an end of coverage time;
  (v) a traffic status; and
  (vi) an access code.

12. The satellite communication system of claim 8, wherein when a satellite moves to a new static terrestrial cell with no satellites assigned to that static terrestrial cell, the satellite assigns itself as a control satellite for that static terrestrial cell.

13. The satellite communication system of claim 9, wherein when a satellite moves to a new static terrestrial cell it requests satellite information for all satellites in the new static terrestrial cell from the control satellite assigned to the new static terrestrial cell.

14. The satellite communication system of claim 13, wherein when a satellite exits a static terrestrial cell, the satellite transmits its satellite information to the control satellite for that static terrestrial cell.

15. The satellite communication system of claim 14, wherein when a control satellite exits a static terrestrial cell, the control satellite assigns a different satellite as the new control satellite for that static terrestrial cell before leaving the cell.

16. The satellite communication system of claim 15, wherein the control satellite exiting the static terrestrial cell determines the satellite with the longest remaining coverage time in that static terrestrial cell, and assigns that satellite as the new control satellite.

17. The satellite communication system of claim 16, wherein the satellite information includes at least one of:
  (a) a connection time of each terrestrial link;
  (b) a satellite identification; and
  (c) an end of coverage time per gateway.

18. The satellite communication system of claim 8, wherein each control satellite assigned to a static terrestrial cell maintains satellite coverage information including:
  (a) coverage time remaining for satellites assigned to that static terrestrial cell; and
  (b) time until coverage for satellites that will move into that static terrestrial cell in the future.

19. The satellite communication system of claim 8, wherein a control satellite transmits a message to a gateway before it will be blacked-out, the message identifying the black-out start time and black-out stop time.

20. The satellite communication system of claim 19, wherein a gateway enters a black-out period and the gateway:
  (1) routes messages over available terrestrial links during black-out periods; or
  (2) stores communication data streams during a black-out period and transmits the stored communication data over a satellite link once satellite coverage resumes.

21. The satellite communication system of claim 8, wherein the first gateway requests an optimal communication packet payload length from the first non-geostationary communication satellite, the first non-geostationary communication satellite determining an optimal communication packet payload length based on system parameters and communication parameters.

22. The satellite communication system of claim 21, wherein the system parameters include at least one of:

(a) which satellites are available to link to the first and second gateways;

(b) loads on each of the available satellites;

(c) an error rate of each satellite;

(d) a cost of service; and (e) number of hops required.

23. The satellite communication system of claim 21, wherein the communication parameters include at least one of:

(a) a priority;

(b) a hop count; and (c) an amount of data to be transferred.

24. The satellite communication system of claim 8, wherein each communication packet includes:

(a) terminal data;

(b) payload information;

(c) a payload;

(d) routing information; and (e) an error correction code.

25. The satellite communication system of claim 24, wherein the terrestrial protocol is at least one of Internet Protocol version 4 (IPv4), Internet Protocol Next Generation (IPv6), or asynchronous transfer mode (ATM).

26. The satellite communication system of claim 24, wherein the terrestrial protocol is comprised of data cells, and the payload comprises a plurality of the data cells.

* * * * *